(12) United States Patent
Wishman et al.

(10) Patent No.: US 9,583,936 B1
(45) Date of Patent: Feb. 28, 2017

(54) LIMITING THE EFFECTS OF FAULTS IN A DATA CENTER

(75) Inventors: Max J. Wishman, Seattle, WA (US); Richard Arvel Stevens, Auburn, WA (US); David E. Bryan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1055 days.

(21) Appl. No.: 13/555,372

(22) Filed: Jul. 23, 2012

(51) Int. Cl.
*H02H 7/00* (2006.01)
*H02H 3/00* (2006.01)
*H02H 7/26* (2006.01)
*H02H 7/22* (2006.01)

(52) U.S. Cl.
CPC .............. *H02H 7/267* (2013.01); *H02H 7/22* (2013.01)

(58) Field of Classification Search
USPC .......................................................... 361/63
See application file for complete search history.

(56) References Cited

U.S. PATENT DOCUMENTS

| | | | |
|---|---|---|---|
| 6,714,977 B1 | 3/2004 | Fowler et al. | |
| 6,782,833 B2 | 8/2004 | Nightall | |
| 7,269,753 B2 | 9/2007 | Farkas et al. | |
| 8,321,163 B2 | 11/2012 | Ewing et al. | |
| 8,374,729 B2 | 2/2013 | Chapel et al. | |
| 2005/0068716 A1 | 3/2005 | Pereira | |
| 2007/0025271 A1* | 2/2007 | Niedrich | G06F 1/189 370/254 |
| 2008/0030078 A1 | 2/2008 | Whitted et al. | |
| 2008/0093927 A1 | 4/2008 | Ewing et al. | |
| 2008/0204961 A1* | 8/2008 | O'Leary | H02H 3/006 361/104 |
| 2009/0073641 A1* | 3/2009 | Ross | H02J 7/0044 361/626 |
| 2009/0234512 A1 | 9/2009 | Ewing et al. | |
| 2012/0074794 A1* | 3/2012 | Morales | G06F 1/26 307/147 |
| 2012/0181869 A1* | 7/2012 | Chapel et al. | 307/64 |

OTHER PUBLICATIONS

"Two-Channel Intercom Power Supply PS-232" Clear-Com Intercom Systems 2002, pp. 1-2.

(Continued)

*Primary Examiner* — Rexford Barnie
*Assistant Examiner* — Xuan Ly
(74) *Attorney, Agent, or Firm* — Robert C. Kowert; Meyertons, Hood, Kivlin, Kowert & Goetzel, P.C.

(57) ABSTRACT

A data center includes one or more racks, computing devices mounted in the racks, and an electrical power system. The electrical power system supplies power to the computing devices in the racks. The electrical power system includes one or more rack power distribution units (PDUs) and one or more floor power distribution units (PDUs) or power panels. The rack PDUs include rack-level circuit protection devices that protect the computing devices receiving power from the rack PDU from overcurrent conditions. The floor PDUs or power panels include floor-level circuit protection devices that protect the computing devices from overcurrent conditions. The rack-level circuit protection devices have a faster response time than the floor-level circuit protection devices.

30 Claims, 6 Drawing Sheets

(56) References Cited

OTHER PUBLICATIONS

Keith Brandt "When Bad Harmonics Happen to Good People" Downloaded May 13, 2011 from news.ospmag.com OSP Magazine published Nov. 2007 pp. 1-3.
U.S. Appl. No. 13/173,102, filed Jun. 30, 2011, Osvaldo P Morales et al.
U.S. Appl. No. 13/076,198, filed Mar. 30, 2011, Osvaldo P. Morales et al.

* cited by examiner

LIMITING THE EFFECTS OF FAULTS IN A DATA CENTER

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a computer room of a computing facility includes many server racks. Each server rack, in turn, includes many servers and associated computer equipment.

Because the computer room of a computing facility may contain a large number of servers, a large amount of electrical power may be required to operate the facility. In addition, the electrical power is distributed to a large number of locations spread throughout the computer room (e.g., many racks spaced from one another, and many servers in each rack). Usually, a facility receives a power feed at a relatively high voltage. This power feed is stepped down to a lower voltage (e.g., 110V). A network of cabling, bus bars, power connectors, and power distribution units, is used to deliver the power at the lower voltage to numerous specific components in the facility.

From time to time, elements in the power chain providing power to electrical systems fail or shut down. For example, if a power distribution unit that provides power to electrical systems is overloaded, an overload protection device in the power distribution unit (for example, a fuse or breaker) may trip, shutting down all of the electrical systems that are receiving power through that line of the power distribution unit.

When a breaker protecting a branch of a power distribution system has tripped, power may be lost to all the electrical systems that receive power from that branch until the breaker has been reset. Maintenance personnel typically need to physically go the rack to restore service to electrical systems (for example, by addressing the overload condition and manually resetting the breaker). The down-time associated with troubleshooting and correcting rack power distribution unit faults and shut downs may result in a significant loss of computing resources. In some critical systems such as hospital equipment and security systems, down-time may result in significant disruption and, in some cases, adversely affect health and safety.

In many cases, moreover, a circuit breaker may trip at a relatively high level in the power distribution chain (for example, a circuit breaker may trip in a floor power distribution unit that supplies power to an entire rack, even though the source of the fault is limited to one load (for example, a short in a single power supply unit in a single server.). Thus, the zone of impact of fault condition (for example, the number of computing devices taken down) may extend well beyond the location of any particular fault.

Figure 1:
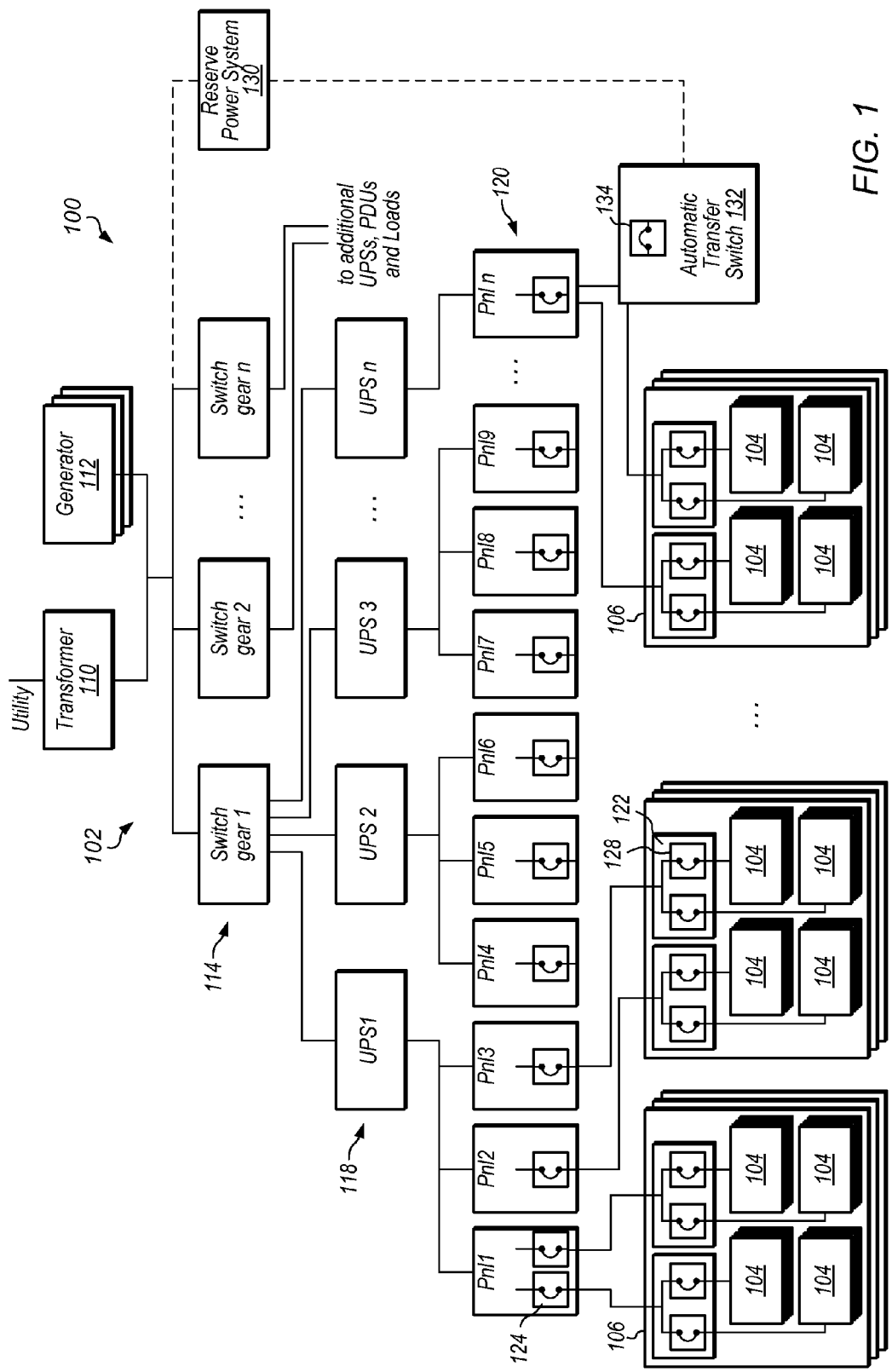
FIG. 1 is a block diagram illustrating one embodiment of a power distribution system with circuit protection devices at multiple levels in the power distribution chain.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of systems and methods for limiting the effects of faults on systems, such as computing devices in data centers, are disclosed. According to one embodiment, a data center includes one or more racks, computing devices mounted in the racks, and an electrical power system. The electrical power system supplies power to the computing devices in the racks. The electrical power system includes one or more rack power distribution units (PDUs) and one or more floor power distribution units (PDUs) or power panels. The rack PDUs distribute electrical power to computing devices in the racks. The floor power distribution units (PDUs) or power panels distribute power to at least one of the rack PDUs. The rack PDUs include rack-level circuit protection devices that protect the computing devices receiving power from the rack PDU from overcurrent conditions. The floor PDUs or power panels include floor-level circuit protection devices that protect the computing devices from overcurrent conditions. The rack-level circuit protection devices have a faster response time than the floor-level circuit protection devices.

According to one embodiment, a system includes one or more racks, electrical systems mounted in the racks, and an electrical power system. The electrical power system supplies power to the electrical systems in the rack via a power distribution chain. The electrical power system includes first-level circuit protection devices at a first level in the power distribution chain. And second-level circuit protection devices at a second level in the power distribution chain. The first level in the power distribution chain is upstream from the second level in the power distribution chain. The second circuit protection devices at the second level have a faster response time than the first circuit protection devices at the first level.

According to one embodiment, a method of limiting the effects of faults in a system includes providing a first circuit protection device at a first level in a power distribution chain of an electrical power system that distributes power to electrical systems and a second circuit protection device at a second level in the power distribution chain. The first level in the power distribution chain is upstream from the second level in the power distribution chain. The circuit protection devices protect electrical systems receiving power from the electrical power system. The second circuit protection device at the second level has a faster response time than the first circuit protection device at the first level.

According to one embodiment, a computing system includes a chassis, one or more circuit board assemblies coupled to the chassis, and a power supply unit coupled to the chassis. A computing device-level circuit protection device is coupled to the power supply unit. The circuit protection device protects electrical components on the circuit board assemblies. The computing device-level circuit protection device has a faster response time than at least one upstream circuit protection device.

As used herein, a "cable" includes any cable, conduit, or line that carries one or more conductors and that is flexible over at least a portion of its length. A cable may include a connector portion, such as a plug, at one or more of its ends.

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "computer room" means a room of a building in which computer systems, such as rack-mounted servers, are operated.

As used herein, "data center" includes any facility or portion of a facility in which computer operations are carried out. A data center may include servers dedicated to specific functions or serving multiple functions. Examples of computer operations include information processing, communications, simulations, and operational control.

As used herein, one component in a power distribution system is "downstream" from another component in the power distribution system if the one component receives power from the other component or is at a lower level in the power distribution system than the other component. For example, a floor PDU may be downstream from a UPS, or a power supply unit in a server may be downstream from a rack PDU.

As used herein "floor-level", as applied to a component or system, means the component or system serves two or more racks on the floor of a computer room or other facility.

As used herein, "floor power distribution unit" refers to a power distribution unit that can distribute electrical power to various components in a computer room. In certain embodiments, a floor power distribution unit includes a transformer. In one embodiment, a floor power distribution unit includes a k-rated transformer. A power distribution unit may be housed in an enclosure, such as a cabinet.

As used herein, a "module" is a component or a combination of components physically coupled to one another. A module may include functional elements and systems, such as computer systems, circuit boards, racks, blowers, ducts, and power distribution units, as well as structural elements, such a base, frame, housing, or container.

As used herein "PDU-level", as applied to a component or system, means the component or system serves a single PDU, or electrical systems coupled to a single PDU.

As used herein, "power distribution unit" means any device, module, component, or combination thereof, that can be used to distribute electrical power. The elements of a power distribution unit may be embodied within a single component or assembly (such as a transformer and a rack power distribution unit housed in a common enclosure), or may be distributed among two or more components or assemblies (such as a transformer and a rack power distribution unit each housed in separate enclosure, and associated cables, etc.). A power distribution unit may include a transformer, power monitoring, fault detection, isolation.

As used herein, "power panel" means any panel, device, module, component, or combination thereof, that can be used to transfer or distribute electrical power from one or more input conductors to one or more output conductors. In certain embodiments, a remote power panel includes main lug only panel conductors. A remote power panel may be housed in an enclosure, such as a cabinet.

As used herein, "primary power" means any power that can be supplied to an electrical load, for example, during normal operating conditions.

As used herein, a "rack" means a rack, container, frame, or other element or combination of elements that can contain or physically support one or more computing devices.

As used herein, a "rack computing system" means a computing system that includes one or more computing devices mounted in a rack.

As used herein "rack-level", as applied to a component or system, means the component or system serves electrical systems in a particular rack. (For example, rack-PDU.

As used herein, "rack power distribution unit" refers to a power distribution unit that can be used to distribute electrical power to various components in a rack. A rack power distribution may include various components and elements, including wiring, bus bars, connectors, and circuit breakers. In some embodiments, a rack power distribution unit may distribute power to only some of the electrical systems in a rack. In some embodiments, a single rack includes two or more rack power distribution units that distribute power to different sets of electrical systems in the rack. For example, one rack may include a left rack power distribution unit that distributes power to half of the servers in the rack, and a right rack power distribution unit that distributes power to the other half of the servers in the rack.

As used herein, "reserve power" means power that can be supplied to an electrical load upon the failure of, or as a substitute for, primary power to the load.

As used herein, one component in a power distribution system is "upstream" from another component in the power distribution system if the one component supplies power to the other component or is at a higher level in the power distribution system than the other component. For example, a UPS may be upstream from a floor PDU, or a rack PDU may be upstream from a power supply unit for a server.

In some embodiments, a system includes electrical systems operating in racks with circuit protection devices at multiple levels in a power distribution chain. The circuit protection devices may protect a circuit from the effect of overcurrent conditions. The circuit protection device at the lower of the two levels may have a faster response time than circuit protection devices at the higher level in power distribution chain. Triggering of circuit protection devices at the lower level limit a zone of impact of a shutdown resulting from a fault in one of the electrical systems.

FIG. 1 is a block diagram illustrating one embodiment of a power distribution system with circuit protection devices at multiple levels in the power distribution chain. System 100 includes power distribution system 102 and electrical systems 104. In one embodiment, system 100 is a data center. Electrical systems 104 may include, for example, computing devices, rack-mounted servers, network control devices, power supply units, air moving devices, and mass storage devices. Electrical systems 104 may be supported in racks 106. Electrical systems 104 may perform various functions in a data center, such as data storage or network services. In one embodiment, electrical systems 104 are servers in a server room of a data center.

Each of electrical systems 104 may include a power supply unit. The power supply unit may supply power to various electrical components, such as integrated circuits, central processing units, solid state memory, and hard disk drives in electrical systems 104.

Power distribution system 102 includes transformer 110, generators 112, switchgear apparatus 114, and primary power systems 116. Each of primary power systems 116 includes UPS 118 and one or more power panels 120.

Electrical systems 104 in racks 106 may each receive power from one of primary power systems 116. In one embodiment, each of primary power systems 116 corresponds to, and provides power to, the servers in one room in a data center. In one embodiment, each of primary power systems 116 corresponds to, and provides power to, one rack system in a data center. In FIG. 1, for the sake of clarity, electrical systems 104 are shown coupled to only one of power panels 120. Electrical systems may, however, be coupled to any or all of power panels 120 in a data center.

Power panels 120 may distribute power from UPSs to electrical systems 104 in racks 106. Power panels 120 may include circuit protection devices, such as circuit breakers. In certain embodiments, power panels 120 are floor power distribution units. In some embodiments, some or all of power panels 120 include a transformer that transforms the voltage from switchgear apparatus 114.

Power panels 120 include circuit protection devices 124. Circuit protection devices 124 may operate to shed loads from electrical systems 104 off of power distribution system 102. Circuit protection devices 124 may be triggered to shed loads on a load circuit-by-load circuit basis. For example, a circuit breaker may shed loads from computing devices operating in a particular rack, or computing devices in a particular half of a rack (for example, top half and bottom half).

In some embodiments, loads are shed by tripping circuit breakers in power panels 120. Loads may be shed by tripping breakers corresponding to, for example, computing devices in a full rack or in half of a rack.

Each of racks 106 may include one or more rack power distribution units 122. The rack power distribution units 122 may distribute power to power supply units in computer systems 104. In one embodiment, each rack power distribution unit 122 distributes electrical power to half of a rack.

Each of rack PDUs includes two branches. Each of the two branches may include a set of output power receptacles. In operation of system 100, receptacles in rack PDU 122 may be used to supply power to electrical systems in rack 106, such as servers. Electrical systems 104 may be coupled to rack power distribution unit 122 by way of cables.

Each of the branches in rack PDU 122 may include circuit protection devices 128. Circuit protection devices may be, for example, circuit breakers or fuses. In one embodiment, each breaker is a 30 A/32 A single pole miniature circuit breaker ("MCB"). Breakers may be located such that they can be accessed when server racks are in-line (e.g., at the top of rack power distribution unit 122). In one embodiment, power is provided to a rack PDU by way of an 8 AWG/6 $mm^2$ 5 core cable and a 30 A NEMA/32 A IEC309 3Ph+N+E Plug.

In some embodiments, circuit protection devices at two or more levels in a power distribution system are selected to limit a zone of impact of a fault in a one or more loads in the system (for example, a short circuit in a computing device). In some embodiments, for example, circuit protection devices 128 in rack PDUs 122 are selected to trip faster than circuit protection devices 124 in power panels 120. In this case, a fault in a single one of electrical systems 106 may cause the circuit protection device 128 in rack PDU 122 to trip, while the associated circuit protection device 124 in power panel 120 does not trip.

In the schematic diagram shown in FIG. 1, for purposes of clarity, each of circuit protection devices 124 and 128 is represented by a box having a single symbol. A circuit protection device may, however, include any number of separate devices. For example, a separate device may be provided for each line of a power distribution circuit. In one embodiment, for instance, separate devices (for example, circuit breakers) are provided for hot and neutral. In another embodiment, separate devices are provided for each phase line of a multi-phase power distribution system.

Although in the system shown in FIG. 1, each of the power panels has one circuit protection device and each of the rack PDUs has two branches and two circuit protection devices, a power panel or rack PDU may, in various embodiments, have any number of branches and any number of circuit protection devices.

In FIG. 1, circuit protection devices 124 are provided in power panels and rack power distribution units that feed electrical systems in racks 106. Circuit protection devices may, nevertheless, be included in other levels and locations in a power distribution system. For example, UPSs 118 or switch gear 114 may include circuit protection devices. In some embodiments, circuit protection devices at each successive level downstream have a faster response time than the upstream circuit protection devices.

In some embodiments, electrical systems, or sets of electrical systems, are assigned one or more identifiers. In some embodiments, power components in a power distribution system, such as power panels, are assigned one or more identifiers. Each identifier may serve as an address for the electrical system, rack system, power component, or a constituent element thereof. The address may be used to map loads (such as server racks) and power components in a system. An identifier may have any suitable format. In some embodiments, a separate identifier may be assigned for the component itself and for additional elements, inputs, or outputs within the component. For example, a separate identifier may be established for each power output receptacle of a power panel.

Transformer 110 is coupled to a utility feed. The utility feed may be a medium voltage feed. In certain embodiments, the utility feed is at a voltage of about 13.5 kilovolts or 12.8 kilovolts at a frequency of about 60 Hz. Generators 112 may provide power to primary power systems 106 in the event of a failure of utility power to transformer 110. In one embodiment, one of generators 112 provides back-up power for each of primary power systems 102.

UPS 118 may provide uninterrupted power to racks 106 in the event of a power failure upstream from UPS 118. In certain embodiments, a UPS receives three-phase power from a transformer. The UPS may supply three-phase power to a floor power distribution unit.

PDU power may be any suitable voltage. In one embodiment, electrical power is about 208 V. In one embodiment, electrical power is about 230 V. In some embodiments, different electrical systems 104 may operate on different phases of a primary power system. Each of the legs may correspond to one phase of the input power. In one embodiment, each leg operates at a voltage between about 220 volts to about 260 volts.

Reserve power system 130 may provide reserve power for any or all of the electrical systems 104 supplied by primary power systems 102. In some embodiments, reserve power system 130 is powered up at all times during operation of system 100. Reserve power system 130 may be passive until a failure of one or more components of the primary power system for one or more of electrical systems 104, at which time reserve power system 130 may become active.

In some embodiments, switching to reserve power is implemented by way of an automatic transfer switch 132. Automatic transfer switch 132 may switch to reserve power 130, for example, in the event of a power loss primary power system 102.

For illustrative purposes, three switchgear apparatus 114, four UPSs 118, and ten power panels 120 are shown in FIG. 1. The number of power distribution units, UPSs, switchgear apparatus may, however, vary from embodiment to embodiment (and, within a given embodiment, from system to system). For example, each of UPSs 118 may supply power to any suitable number of power panels 120. As another example, each of switchgear apparatus 114 may supply power to any suitable number of UPSs 118.

In FIG. 1, circuit protection devices are shown for illustrative purposes at a power panel level and a rack PDU level. Circuit protection devices may, however, be provided at any level in a power distribution chain. Circuit protection devices at a lower level in the chain may have a faster response time than upstream circuit protection devices.

In some embodiments, circuit protection devices are included in an automatic transfer switch (for example, an ATS that switches power from a primary power system to a reserve power system). For example, automatic transfer switch 132 includes circuit protection device 134.

In some embodiments, a map is generated for electrical systems (for example, servers) that perform operations in a facility, power components in a power distribution system, or both. The map may be based on signals sent from various components in a data center. For example, in the embodiment shown in FIG. 1, a map can be established that includes sets of electrical systems 104 in racks 106 (for example, servers in one half of a particular rack), rack PDUs 122, power panels 120, and UPSs 118.

In some embodiments, computing assets are mapped to one or more power distribution system components and/or branches. Mapping may be based on IDs assigned to one or more assets, or sets of assets, of a system. In one embodiment, sets of computing devices operating in racks are mapped to circuit breakers that provide overcurrent protection for that set of computing devices. For example, Servers ID0001 through 0010 in Rack 0006 in Data Center 4 may be mapped to Circuit Breaker A021 in Power Panel PP062 in Data Center 4; Servers ID0011 through 0020 in Rack 0007 of Data Center 4 may be mapped to Circuit Breaker A022 in Power Panel PP062 in Data Center 4; etc.

In some embodiments, baseline data for mapping of components one or more a computing facilities are stored in a database. At a later time, the map may be updated based on a new set of messages from components in the computing facilities. Comparisons between the baseline data and current data may be used to assess conditions or components.

Electrical systems protected by overload protection devices may be of various types. Examples include hospital equipment, utility systems, security systems, military systems, telecommunications systems, or electronic commerce systems. In certain embodiments, a load shedding system protects operation of a critical system, such as a life support system. In some embodiments, the systems are computing devices (for example, servers) in a data center.

Figure 2:
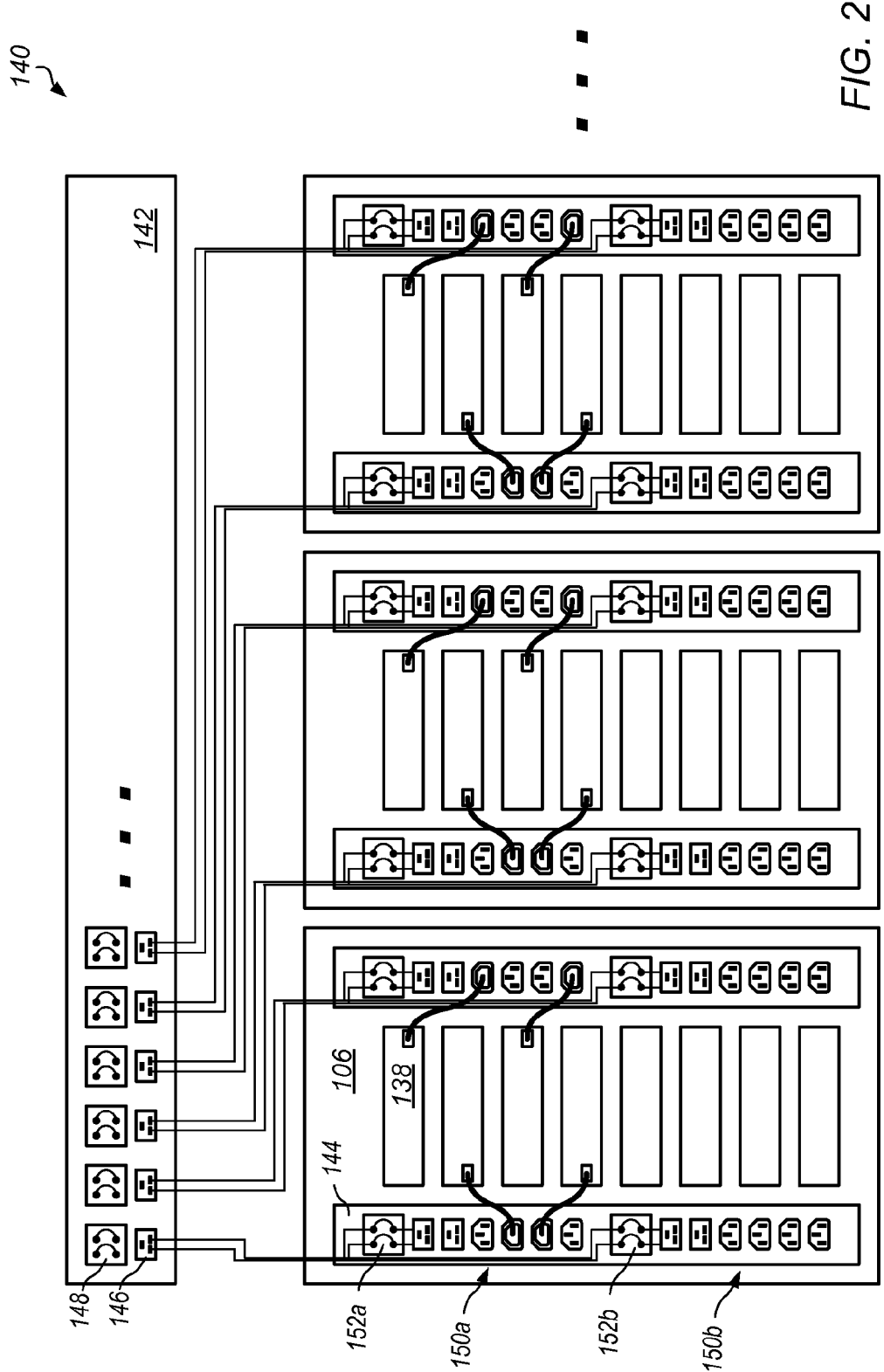
FIG. 2 illustrates one embodiment of data center with one set of circuit protection devices at a power panel-level and another set of circuit protection devices at a rack-PDU level.

FIG. 2 illustrates one embodiment of data center with one set of circuit protection devices at a power panel-level and another set of circuit protection devices at a rack-PDU level. System 140 includes computing devices 138 in racks 106. Computing devices 138 receive power fed through power panel 142 and rack PDUs 144. Power panel 142 includes circuit protection devices 146 and output receptacles 148. Each of rack PDUs 144 includes banks of output receptacles 150a and 150b. The set of computing devices 138 that are coupled in output receptacles 150a may be protected by circuit protection device 152a. The set of computing devices 138 that are coupled in output receptacles 150b may be protected by circuit protection device 152b. In one embodiment, each of circuit protection devices 152a, 152b, and 146 are circuit breakers.

Each of circuit protection devices 152a and 152b in rack PDUs 144 may be selected so that one circuit protection devices 152a and 152b trips faster than the associated upstream circuit protection device 146. If there is an overcurrent condition (for example, a short in one of the computing devices) in one the computing devices coupled to one of output receptacles in bank 150a, circuit protection device 152a may trip. The other circuit protection device in the same rack PDU (circuit protection device 152b) and upstream circuit protection device 146 do not trip. Thus, the computing devices in the rack that receive power through bank 150b may be unaffected by a fault in a computing device connected to bank 150a.

Suitable types of circuit breakers may include, in various embodiments, a thermal-magnetic circuit breaker, a magnetic circuit breaker, a mechanical circuit breaker, or an electronic circuit breaker. In certain embodiments, a circuit breaker is remotely resettable (for example, by a load shedding controller). In certain embodiments, a circuit breaker has a timed reset (for example, resetting after automatically after a predetermined time period if an overload condition has been resolved). In certain embodiments, an electronic circuit breaker may be included at a lower level in a power distribution chain, and a thermal magnetic circuit breaker may be provided at a higher level in the power distribution chain.

Although in FIG. 2, faster circuit protection devices are included at one level than the next higher level, faster circuit protection devices may in various embodiments by provided at any number of successive downstream levels within a power distribution chain. For example, relatively slow circuit protection devices may be provided at a floor PDU level, faster circuit protection devices may be included a rack PDU-level, and a still faster circuit protection devices may be provided at a server-level.

In various embodiments, some of the circuit protection devices at one or more levels in a power distribution chain detect an imbalance between power lines supplying power to electrical systems, a magnitude of current in one or more power lines supplying power to electrical systems, or both. Circuit protection devices may include, in some embodiments, active circuits to detect conditions of power lines. In certain embodiments, an electronic circuit protection device includes one or more op amps.

In some embodiments, a circuit protection device includes one or more residual current devices. Examples of residual current devices that may be used include residual-current circuit breaker ("RCCB") devices, residual current circuit breaker with overload protection ("RCBO") devices, appliance leakage current interrupter ("ALCI") devices, and ground fault circuit interruption ("GFCI") devices. In some embodiments, the ground fault interruption circuit elements are coupled to the power distribution lines in a manner that provides overcurrent protection for the loads on the power lines. The circuit protection devices included at one level in the power distribution chain may be selected to respond faster than circuit protection devices at a higher level in the power distribution chain. In certain embodiments, a residual current device is used in combination with (for example, in series with) one or more circuit breakers.

Figure 3:
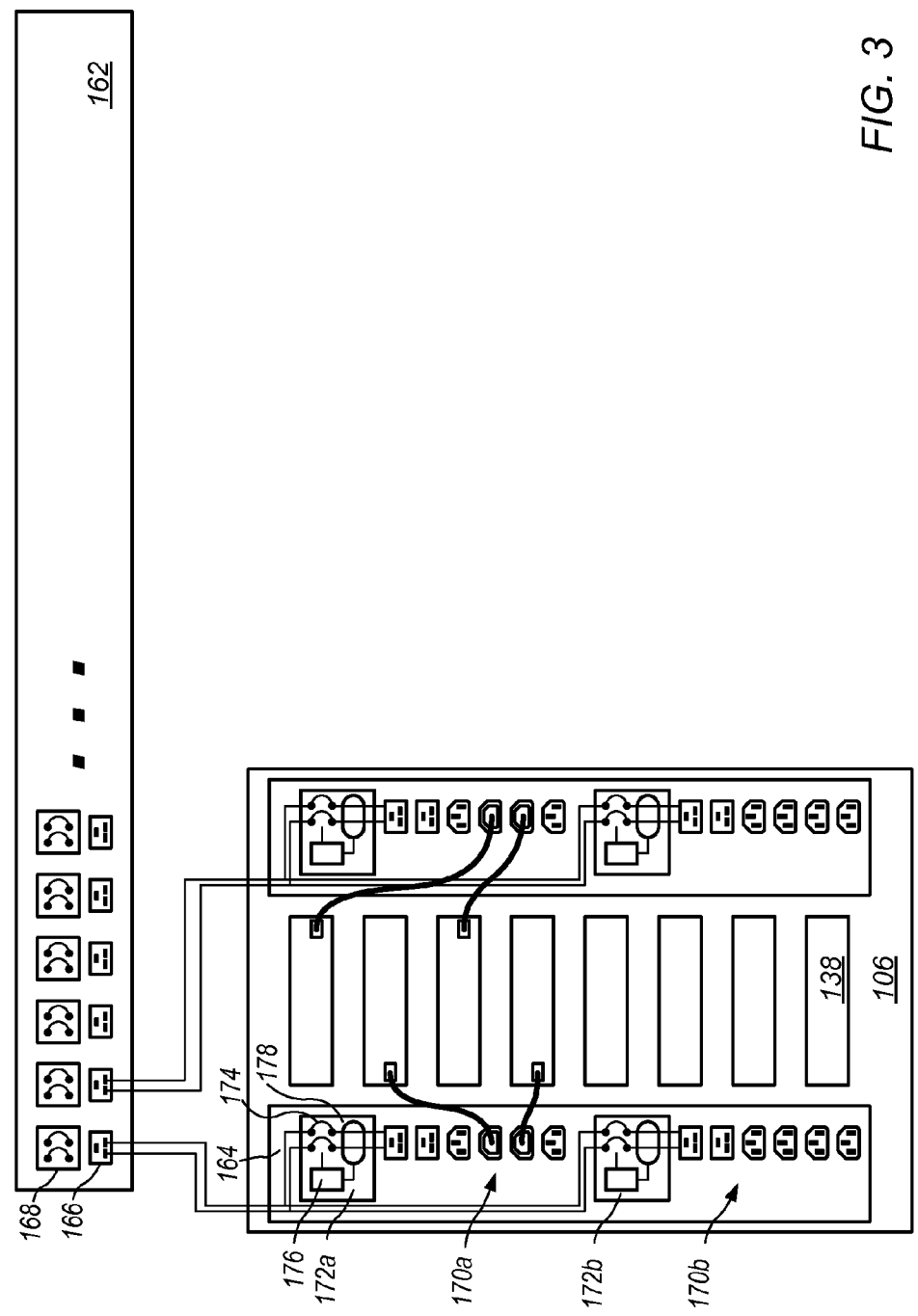
FIG. 3 illustrates one embodiment of a system including a circuit protection devices ground fault interruption circuit at a rack PDU-level of a power distribution system.

FIG. 3 illustrates one embodiment of a system including a circuit protection devices ground fault interruption circuit at a rack PDU-level of a power distribution system. System 160 includes computing devices 138 in racks 106. Computing devices 138 receive power fed through power panel 162 and rack PDUs 164. Power panel 162 includes circuit protection devices 166 and output receptacles 168. Each of rack PDUs 164 includes banks of output receptacles 170a and 170b. The set of computing devices 138 that are coupled in output receptacles 170a may be protected by circuit protection device 172a. The set of computing devices 138 that are coupled in output receptacles 170b may be protected by circuit protection device 172b.

Each of circuit protection devices 172a and 172b includes circuit breakers 174, electronic circuit protection device 176, and current transformer 178. Electronic circuit protection device 176 may detect an imbalance between two or more of the power lines to computing devices 138, a magnitude of current in one or more of the power lines to computing devices 138, or both. In one embodiment, electronic circuit protection device 176 interrupts power in response to an imbalance exceeding a predetermined threshold. In another embodiment, electronic circuit protection device 176 interrupts power in response to a magnitude of current in one of the lines exceeding a predetermined threshold. In certain embodiments, electronic circuit protection device 176 interrupts power in response to either an imbalance that exceeds a predetermined threshold or a magnitude of current in one of the lines exceeding a predetermined threshold.

Current transformer 178 may respond to current in power lines that distribute power to computing devices 138 through output receptacles in rack PDU 164. In some embodiments, electronic circuit protection device 176 uses information from current transformer 178 to trigger circuit protection for computing devices coupled to rack PDU 164.

In some embodiments, a circuit protection device in an ATS detects an imbalance between two or more power lines. For example, circuit protection device 134 may detect an imbalance between two phase lines in automatic transfer switch 132. In response to the imbalance, the circuit protection device may interrupt power to some or all of the electrical systems coupled to the ATS.

Figure 4:
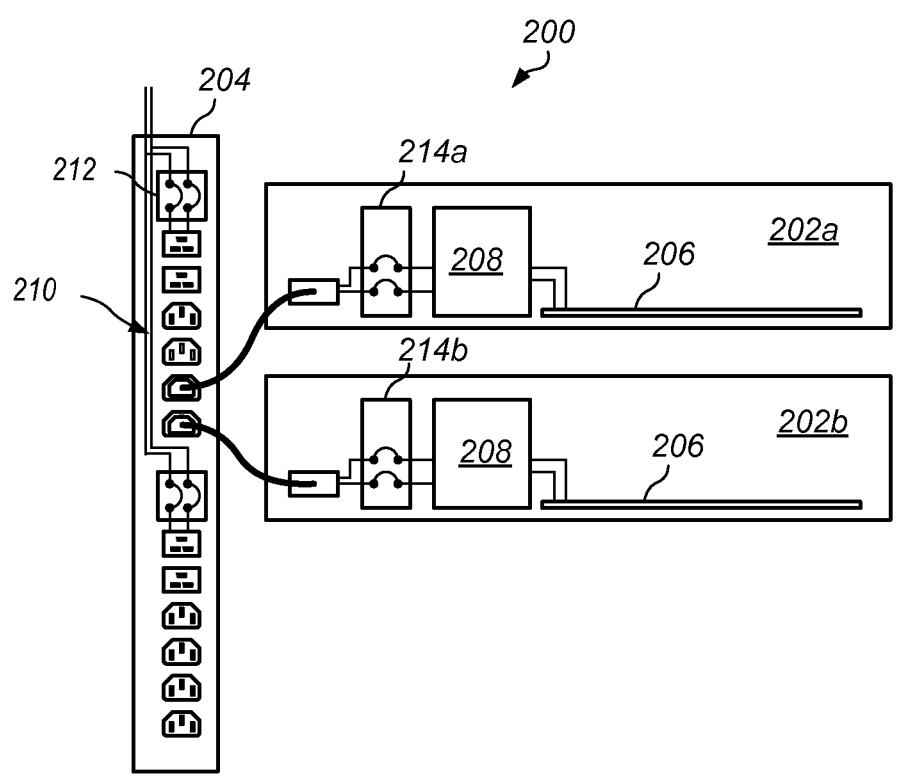
FIG. 4 illustrates one embodiment of a computing system with a circuit protection device between a rack PDU and a power supply unit for the computing system.

In some embodiments, a computing system (for example, a server) includes a circuit protection device that responds faster than a circuit protection device at a higher level in a power distribution chain. FIG. 4 illustrates one embodiment of a computing system with a circuit protection device between a rack PDU and a power supply unit for the computing system. System 200 includes computing device 202a, computing device 202b, and rack PDU 204. Although only two computing devices are shown for illustrative purposes, rack PDU 204 may supply power to many additional computing devices in a rack. Rack PDU 204 includes output receptacle banks 210 and circuit protection devices 212.

Computing devices 202a and 202b include motherboard assembly 206 and power supply unit 208. Computing device 202a includes circuit protection device 214a between power supply unit 208 and rack PDU 204. Computing device 202b includes circuit protection device 214b between power supply unit 208 and rack PDU 204.

Circuit protection devices 214a and 214b may respond faster than circuit protection device 212 in rack PDU 204. In the event of a fault in one of computing devices, the corresponding one of the computing device-level circuit protection devices (for example, circuit protection device 214a if the fault is in computing device 202a) may trip. Circuit protection device 212 and circuit protection device 214b may not trip. Thus, power may be maintained to computing device 202b despite the fault that has occurred in computing device 202a.

Figure 5:
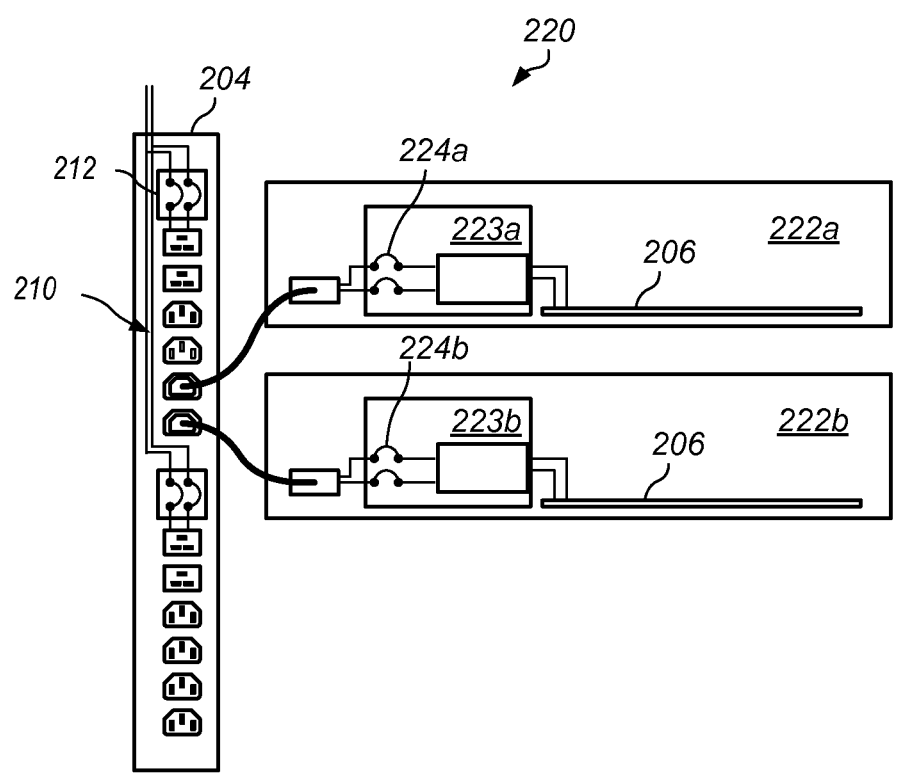
FIG. 5 illustrates one embodiment of a computing system with a circuit protection device included in a power supply unit for the computing system.

In some embodiments, a circuit protection device included in a power supply unit for a computing device has a faster response time than circuit protection devices upstream from the power supply unit. FIG. 5 illustrates one embodiment of a computing system with a circuit protection device included in a power supply unit for the computing system. System 220 includes computing device 222a, computing device 222b, and rack PDU 204. Although only two computing devices are shown for illustrative purposes, rack PDU 204 may supply power many additional computing devices in a rack. Rack PDU 204 includes output receptacle banks 210 and circuit protection devices 212.

Computing devices 222a and 222b each include motherboard assembly 206. Computing device 222a includes power supply unit 223a. Computing device 222b includes power supply unit 223b. Power supply unit 223a includes circuit protection device 224a. Power supply unit 223b includes circuit protection device 224b. Circuit protection devices 224a and 224b may respond faster than circuit protection device 212 in rack PDU 204.

In certain embodiments, a circuit protection device for a server may be provided downstream from a power supply unit. For example, a circuit protection device may be provided between power supply between power supply unit 208 and motherboard assembly 206. The circuit protection device may have a faster response time than an upstream circuit protection device (for example, circuit protection devices 212 in rack PDU 204).

In some embodiments, limiting the effect of faults in a system (such as a data center) includes providing two or more levels of circuit protection. Circuit protection devices selected for the lower levels in a power distribution chain may be selected to respond to fault conditions faster than circuit protection devices upstream in the power distribution system.

Figure 6:
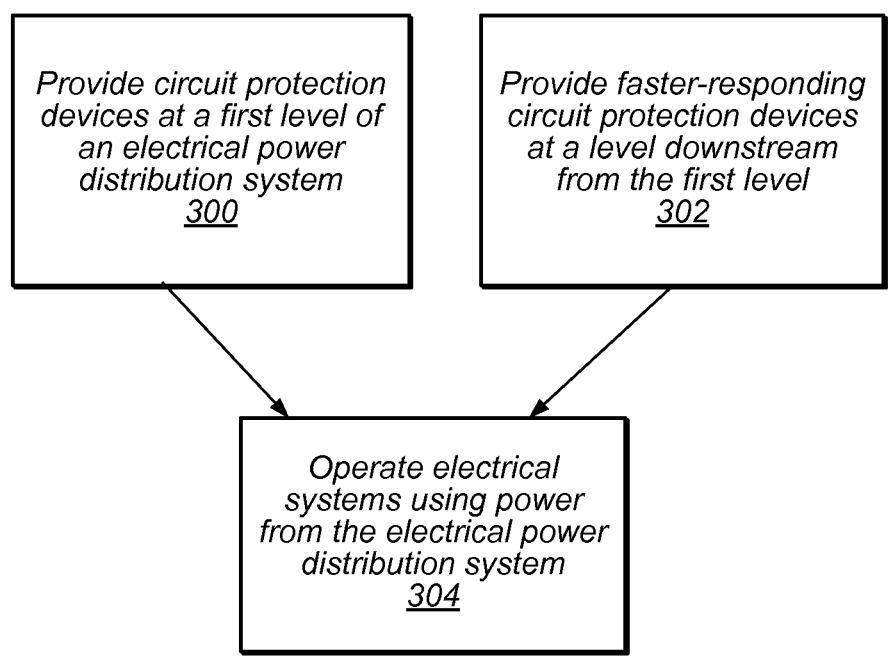
FIG. 6 illustrates limiting the effects of a fault with circuit protection devices at multiple levels of a power distribution system.

FIG. 6 illustrates limiting the zone of effects of a fault with circuit protection devices at multiple levels of a power distribution system. At 300, a first circuit protection device at a first level in a power distribution chain of an electrical power system that distributes power to electrical system.

At 302, a second circuit protection device at a level in the power distribution chain that is downstream from the first level. The second circuit protection device at the second level may have a faster response time than the first circuit protection device at the first level. In some embodiments, circuit protection device at the second level are provided on each branch of power distribution circuit (for example, one circuit protection device in each branch of a rack PDU.)

At 304, electrical systems may be operated in using power from the electrical power distribution system. The electrical systems may be, for example, computing devices in a data center.

In certain embodiments, a circuit protection device may be coupled to an alarm. An alarm may be, for example, an audible alarm (such as a buzzer or siren) or a visual alarm (flashing light).

In some embodiments, loads are shed on a load circuit-by-load circuit basis. For example, loads may be shed from computing devices operating in a particular rack, or computing devices in a particular half of a rack (for example, top half and bottom half).

In some embodiments, loads are shed in a portion of a facility based on aggregate conditions, characteristics, or status of operations for at another portion of the facility. For example, if loads on a power distribution system spike because increased activity in Rack Computing Systems A, B, C in a data center, the system may shed loads from computing devices in Rack Computing System D.

Although in many of the embodiments described herein, circuit protection is described for rack computing systems in a data center, circuit protection may, in various embodiments, be performed for other types of electrical systems. For example, electrical circuit protection may be provided for electrical systems at a power plant, manufacturing plant, medical care facility, or office building.

Although in many of the embodiments described herein, electrical power shedding is described as a response to overload conditions on an electrical power system, electrical power shedding may in various embodiments be carried out in response to other conditions, events, or circumstances. For example, load shedding may be carried out in response to weather conditions, such as a tornado, hurricane, or flood. In one embodiment, load shedding is carried out in response to unauthorized access to electrical systems (such as a hacker attack on a computing facility), or the risk of such unauthorized access.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
one or more racks;
two or more computing devices mounted in at least one of the racks; and
an electrical power system configured to supply power to at least some of the computing devices in the rack, the electrical power system comprising:
one or more rack power distribution units (PDUs) in at least one of the racks, wherein at least one of the rack PDUs is configured to distribute electrical power to at least part of the computing devices in at least one of the racks; and
one or more floor power distribution units (PDUs) or power panels configured to distribute power to at least one of the rack PDUs,
wherein at least one of the rack PDUs comprises one or more rack-level circuit protection devices configured to protect at least two of the computing devices receiving power from the rack PDU from overcurrent conditions,
wherein at least one of the floor PDUs or power panels comprises a floor-level circuit protection device configured to protect the at least two computing devices from overcurrent conditions,
wherein at least one of the rack-level circuit protection devices is configured to have a faster response time than the floor-level circuit protection device.

2. The data center of claim 1, wherein at least one of the rack PDUs comprises two or more rack-level circuit protection devices, wherein each of at least two of the rack-level circuit protection devices is configured to protect a different set of computing devices, wherein at least one of the floor-level circuit protection devices is upstream from the at least two rack-level circuit protection devices, wherein each of the at least two rack-level circuit protection devices has a faster response time than the at least one floor-level circuit protection device.

3. The data center of claim 1, wherein at least one of the rack-level circuit protection devices is configured to detect an imbalance between two or more power lines, wherein the at least one rack-level circuit protection device is configured to interrupt power to a set of electrical systems in response to an imbalance that exceeds a predetermined threshold.

4. The data center of claim 1, wherein at least one of the rack-level circuit protection devices is configured to detect an imbalance between two or more power lines and to detect a magnitude of current in at least one power line, wherein the at least one rack-level circuit protection device is configured to interrupt power to a set of electrical systems in response to an imbalance that exceeds a predetermined threshold or in response to a magnitude of current that exceeds a predetermined threshold.

5. The data center of claim 1, further comprising one or more computing device-level circuit protection devices, wherein each of at least one of the computing device-level circuit protection devices is configured to protect electrical components in one of the computing devices receiving power from at least one of the rack PDUs, wherein the at least one circuit protection device at the computing device-level has a faster response time than a rack-level circuit protection device upstream from the computing device-level circuit protection device.

6. A system comprising:
one or more racks;

two or more electrical systems mounted in at least one of the racks; and an electrical power system configured to supply power to at least some of the electrical systems in the rack via a power distribution chain, the electrical power system comprising:

one or more first-level circuit protection devices at a first level in the power distribution chain, wherein at least one of the one or more first-level circuit protection devices is configured to protect at least one of the electrical systems from overcurrent conditions; and one or more second-level circuit protection devices at a second level in the power distribution chain, wherein at least one of the second-level circuit protection devices is configured to protect the at least one electrical system from overcurrent conditions, wherein the first level in the power distribution chain is upstream from the second level in the power distribution chain, wherein the at least one of the second-level circuit protection devices at the second level is configured to have a faster response time than the at least one first-level circuit protection device at the first level.

7. The system of claim 6, wherein the one or more second-level circuit protection devices comprise two or more second-level circuit protection devices, wherein each of at least two of the second-level circuit protection devices is configured to protect a different set of electrical systems, wherein at least one of first-level circuit protection devices is upstream from the at least two second-level circuit protection devices, wherein each of the at least two second-level circuit protection devices has a faster response time than the at least one first-level circuit protection device.

8. The system of claim 6, wherein each of the at least two second-level circuit protection devices is configured to detect an imbalance between two or more power lines, wherein each of the at least two second-level circuit protection devices is configured to interrupt power to a set of electrical systems in response to an imbalance that exceeds a predetermined threshold.

9. The system of claim 6, wherein each of the at least two second-level circuit protection devices is configured to detect a magnitude of current in at least one power line, wherein each of the at least two second-level circuit protection devices is configured to interrupt power to a set of electrical systems in response to a magnitude of current that exceeds a predetermined threshold.

10. The system of claim 6, wherein each of the at least two second-level circuit protection devices is configured to detect an imbalance between two or more power lines and to detect a magnitude of current in at least one power line, wherein the at least one at least two second-level circuit protection devices is configured to interrupt power to a set of electrical systems in response to an imbalance that exceeds a predetermined threshold or in response to a magnitude of current that exceeds a predetermined threshold.

11. The system of claim 6, wherein the at least two second-level circuit protection devices each comprise an electronic circuit protection device comprising an active circuit configured to detect at least one of an imbalance between two or more power lines or a magnitude of current in at least one power line, wherein the at least one first-level circuit protection device comprises a thermal-magnetic circuit breaker or a mechanical circuit breaker.

12. The system of claim 6, wherein the at least two second-level circuit protection devices each comprise a residual current device.

13. The system of claim 6, wherein at least one of the second-level circuit protection devices is configured to trip power including a hot line and a neutral line.

14. The system of claim 6, wherein at least one of the second-level circuit protection devices is configured to trip power including two or more phase lines.

15. The system of claim 6, further comprising one or more third-level circuit protection devices at third level in the power distribution chain, wherein at least one of the third-level circuit protection devices is configured to protect the at least one electrical system.

16. The system of claim 15, wherein the third level is downstream in the power distribution chain from the second level, wherein the at least one third-level circuit protection device has a faster response time than a second-level circuit protection device upstream from the third-level circuit protection device.

17. The system of claim 6, wherein the first level is a floor level and the second-level is a rack level.

18. The system of claim 6, wherein the first level is a rack-level and the second level is at a power supply unit-level.

19. The system of claim 18, wherein the at least one second-level circuit protection device at in a power supply unit for the at least one electrical system.

20. The system of claim 18, wherein the at least one second-level circuit protection device is external to a power supply unit for the at least one electrical system.

21. A method of limiting the effects of faults in a system, comprising:

providing a first circuit protection device at a first level in a power distribution chain of an electrical power system that distributes power to electrical systems, wherein the first circuit protection device is configured to protect at least one of the electrical systems from overcurrent conditions, providing a second circuit protection device at a second level in the power distribution chain, wherein the second circuit protection device is configured to protect the at least one electrical system from overcurrent conditions, wherein the first level in the power distribution chain is upstream from the second level in the power distribution chain, wherein the second circuit protection device at the second level is configured to have a faster response time than the first circuit protection device at the first level.

22. The method of claim 21, further comprising shutting down the at least one electrical system by triggering the second-level circuit protection device, wherein second-level circuit protection device is triggered without triggering the first level overprotection device.

23. The method of claim 21, wherein the second circuit protection device at the second level is configured to detect an imbalance between two or more power lines and to detect a magnitude of current in at least one power line, wherein the second circuit protection device is configured to interrupt power to a set of electrical systems in response to an imbalance that exceeds a predetermined threshold or in response to a magnitude of current that exceeds a predetermined threshold.

24. The method of claim 21, wherein the first level is a floor level and the second-level is a rack level.

25. The method of claim 21, wherein the second level is a floor level and the first level is upstream from the floor level.

26. The method of claim 21, wherein the first level is a rack-level and the second level is at a power supply unit-level.

27. A computing system, comprising:
- a chassis;
- one or more circuit board assemblies coupled to the chassis;
- a power supply unit coupled to the chassis, wherein the power supply unit is configured to supply power to electrical components on at least one of the circuit board assemblies; and
- a computing device-level circuit protection device coupled to the power supply unit, wherein the circuit protection device is configured to protect electrical components on the at least one circuit board assembly,
- wherein the computing device-level circuit protection device is configured to have a faster response time than at least one upstream circuit protection device.

28. The computing system of claim 27, wherein the computing device-level circuit protection device comprises a circuit breaker.

29. The computing system of claim 27, wherein the computing device-level circuit protection device is inside a chassis for the power supply unit.

30. The computing system of claim 27, wherein the computing device-level circuit protection device is external to a chassis for the power supply unit.

* * * * *